US012620654B2

(12) United States Patent
Kim et al.

(10) Patent No.: US 12,620,654 B2
(45) Date of Patent: May 5, 2026

(54) BUTTON-TYPE SECONDARY BATTERY

(71) Applicant: LG ENERGY SOLUTION, LTD.,
Seoul (KR)

(72) Inventors: Min Gyu Kim, Daejeon (KR); **Yong
Gon Lee, Daejeon (KR); Je Jun Lee**,
Daejeon (KR); Jae Won Lim, Daejeon
(KR); Geon Woo Min, Daejeon (KR);
Min Su Cho, Daejeon (KR); **Joo Hwan
Sung, Daejeon (KR); Sang Hak Chae**,
Daejeon (KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 631 days.

(21) Appl. No.: 18/017,845

(22) PCT Filed: Sep. 16, 2021

(86) PCT No.: PCT/KR2021/012697
§ 371 (c)(1),
(2) Date: Jan. 24, 2023

(87) PCT Pub. No.: WO2022/060123
PCT Pub. Date: Mar. 24, 2022

(65) Prior Publication Data
US 2023/0291039 A1      Sep. 14, 2023

(30) Foreign Application Priority Data

Sep. 16, 2020   (KR) ........................ 10-2020-0119500
Aug. 18, 2021   (KR) ........................ 10-2021-0109102

(51) Int. Cl.
*H01M 50/109*        (2021.01)
*H01M 50/153*        (2021.01)
(Continued)

(52) U.S. Cl.
CPC ....... *H01M 50/109* (2021.01); *H01M 50/153*
(2021.01); *H01M 50/30* (2021.01); *H01M
50/528* (2021.01); *H01M 50/533* (2021.01)

(58) Field of Classification Search
CPC .. H01M 50/109; H01M 50/528; H01M 50/30;
H01M 50/533; H01M 50/153
See application file for complete search history.

(56) References Cited

U.S. PATENT DOCUMENTS

2002/0031704 A1    3/2002  Okahisa et al.
2004/0157115 A1    8/2004  Bouffard et al.
(Continued)

FOREIGN PATENT DOCUMENTS

CN        201274299 Y     7/2009
CN        101789498 A     7/2010
(Continued)

OTHER PUBLICATIONS

International Search Report (with partial translation) and Written
Opinion dated Dec. 28, 2021, for corresponding International Patent
Application No. PCT/KR2021/012697.
(Continued)

*Primary Examiner* — Karie O'Neill Apicella
(74) *Attorney, Agent, or Firm* — Morgan, Lewis &
Bockius LLP

(57) ABSTRACT
A button-type secondary battery includes an electrode
assembly; a lower can into which the electrode assembly is
disposed; and an upper can configured to cover an opening
of an upper end of the lower can. A beading part recessed
inward is provided in an upper portion of the lower can. An
end of the upper can has a bent shape so the upper can and
the lower can are coupled to each other while an end point
of the end of the upper can is inserted into the beading part.

12 Claims, 4 Drawing Sheets

10

3

(51) Int. Cl.
  H01M 50/30     (2021.01)
  H01M 50/528    (2021.01)
  H01M 50/533    (2021.01)

(56) References Cited

U.S. PATENT DOCUMENTS

| | | | |
|---|---|---|---|
| 2004/0157120 A1 | 8/2004 | Wu et al. | |
| 2007/0134547 A1 | 6/2007 | Bouffard et al. | |
| 2008/0081253 A1 | 4/2008 | Shose et al. | |
| 2010/0136388 A1 | 6/2010 | Kim et al. | |
| 2013/0330601 A1 | 12/2013 | Mizuta et al. | |
| 2015/0243938 A1 | 8/2015 | Kim et al. | |
| 2017/0187008 A1 | 6/2017 | Gaugler | |
| 2017/0365874 A1 | 12/2017 | Pytlik et al. | |
| 2018/0053974 A1* | 2/2018 | Lee .................... | H01M 50/147 |
| 2019/0348702 A1 | 11/2019 | Zhu et al. | |
| 2019/0386270 A1 | 12/2019 | Lee et al. | |
| 2020/0194820 A1 | 6/2020 | Pytlik et al. | |
| 2021/0111454 A1 | 4/2021 | Zhu et al. | |
| 2021/0257652 A1 | 8/2021 | Ko et al. | |

FOREIGN PATENT DOCUMENTS

| | | | |
|---|---|---|---|
| CN | 104662694 A | 5/2015 | |
| CN | 206076410 U | 4/2017 | |
| CN | 207368144 U | 5/2018 | |
| CN | 110828885 A | 2/2020 | |
| CN | 210245625 U | 4/2020 | |
| CN | 210379130 U | 4/2020 | |
| CN | 211182396 U | 8/2020 | |
| EP | 1595298 B1 * | 9/2010 | .......... H01M 50/147 |
| JP | S45-003776 Y | 2/1970 | |
| JP | S47-021128 U | 11/1972 | |
| JP | 2003045480 A | 2/2003 | |
| JP | 2003-242941 A | 8/2003 | |
| JP | 2005-044649 A | 2/2005 | |
| JP | 2006-66308 A | 3/2006 | |
| JP | 2006-517725 A | 7/2006 | |
| JP | 2008-084752 A | 4/2008 | |
| JP | 2008-262826 A | 10/2008 | |
| JP | 2010-129546 A | 6/2010 | |
| JP | 2012-517658 A | 8/2012 | |
| JP | 2018-514899 A | 6/2018 | |
| JP | 2019-016594 A | 1/2019 | |
| KR | 10-2011-0000517 A | 1/2011 | |
| KR | 10-2018-0127938 A | 11/2018 | |
| KR | 10-2019-0010566 A | 1/2019 | |
| KR | 10-2020-0020173 A | 2/2020 | |
| KR | 10-2020-0039214 A | 4/2020 | |
| WO | 00/035033 A1 | 6/2000 | |

OTHER PUBLICATIONS

Extended European Search Report dated Jul. 8, 2024 issued in European Patent Application No. 21869745.6.

Office Action issued in JP application 2023-510456 dated Apr. 2, 2024.

Office Action issued on Aug. 20, 2025 in Chinese Patent Application No. 202180057270.4 (Note: JPS4721128U, CN210379130U, CN210245625U, CN211182396U and CN101789498A cited therein are already of record.).

* cited by examiner

10

BUTTON-TYPE SECONDARY BATTERY

CROSS-REFERENCE TO RELATED APPLICATION

The present application claims the benefit of the priority of Korean Patent Application Nos. 10-2020-0119500, filed on Sep. 16, 2020, and 10-2021-0109102, filed on Aug. 18, 2021, which are hereby incorporated by reference in their entirety.

TECHNICAL FIELD

The present invention relates to a button-type secondary battery, and more particularly, to a button-type secondary battery, which is capable of collecting a gas within the battery even if an excessive internal pressure is generated by the gas generated in the battery to prevent the battery from being disassembled or prevent a gas that is harmful to the human body from leaking to the outside of the battery by the gas pressure and prevent an electrolyte from leaking to the outside of the battery.

BACKGROUND ART

In recent years, the price of energy sources increases due to the depletion of fossil fuels, the interest in environmental pollution is amplified, and the demand for eco-friendly alternative energy sources is becoming an indispensable factor for future life. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile and electric vehicles using batteries increase, the demands for batteries as energy sources are rapidly increasing. Thus, many studies on batteries which are capable of meeting various demands have been conducted.

In particular, in terms of materials, there is a high demand for lithium secondary batteries such as lithium ion batteries and lithium ion polymer batteries having advantages such as high energy density, discharge voltage, and output stability.

The secondary batteries are classified into cylindrical batteries and prismatic batteries, in which an electrode assembly is embedded in a cylindrical or prismatic metal can, and pouch-type batteries, in which an electrode assembly is embedded in a pouch-type case made of an aluminum laminate sheet according to shapes of battery cases. Also, recently, due to the trend of smaller wearable devices, the importance of developing small batteries such as button-type secondary batteries has been highlighted.

FIG. 1 is a cross-sectional view of a button-type secondary battery according to the related art.

Referring to FIG. 1, a button-shaped secondary battery 10 according to the related art has a shape that is divided into upper and lower housings and has a structure in which an upper cylindrical can 4 and a lower cylindrical can 3 are press-fitted. That is, an outer diameter of the lower cylindrical can 3 is slightly larger than that of an upper portion thereof to realize the press-fitting. In the case of the press-fitting, it is the principle that a shape of the button-type secondary battery is maintained due to friction force due to the press-fitting. Also, in the button-shaped secondary battery according to the related art, the upper can 4 and the lower can 3 are manufactured to match a size of an internal electrode assembly 1 so as to be press-fitted with each other, and thus, there is no available space therein.

However, in this configuration, when the internal pressure increases due to generation of an internal gas, etc., there is no fixing force other than frictional force, and thus, there is a high possibility that the upper can 4 and the lower can 3 are separated from each other. If the internal pressure rises, the internal pressure may rise due to side reactions and also rise during a normal cycle, but if the internal pressure excessively rises, the upper can and the lower can are separated from each other and thus may not function as a battery.

Therefore, a battery capable of collecting a gas caused by the internal reaction of the battery is required, and studies on a product in which the upper can is not separated from each other is also required.

In addition, the button-type secondary battery 10 according to the related art had a structure with a high possibility of leakage of the electrolyte. That is, since a leak path through which the electrolyte leaks is simple, possibility of leakage of the electrolyte is high, and thus, many studies have been conducted to solve this problem.

DISCLOSURE OF THE INVENTION

Technical Problem

The present invention has been devised to solve the above problems, and an object of the present invention is to collect a gas within the battery even if an excessive internal pressure is generated by the gas generated in the battery so as to prevent the battery from being disassembled or prevent a gas that is harmful to the human body from leaking to the outside of the battery by the gas pressure and prevent an electrolyte from leaking to the outside of the battery.

Technical Solution

A button-type secondary battery, of which a diameter is greater than a height, according to the present invention comprises: an electrode assembly; a lower can into which the electrode assembly is inserted; and an upper can configured to cover an opening of an upper end of the lower can, wherein a beading part recessed inward is provided in an upper portion of the lower can, and an end of the upper can has a bent shape so the upper can and the lower can are coupled to each other while an end point of the end of the upper can is inserted into the beading part.

A collection space in which an internal gas is collected may be provided between the upper can and the electrode assembly.

The upper can may comprise: an upper can electrode terminal part connected to an electrode of the electrode assembly to form a terminal and configured to cover the opening of the upper end of the lower can; a first bent part bent to extend from an end of the upper can electrode terminal part toward a bottom surface of the lower can; and a second bent part bent to extend from an end of the first bent part in a direction of a central axis of the lower can and disposed inside the beading part.

The lower can may comprise a lower can upper end vertical part bent to extend from an end of the beading part toward the upper can electrode terminal part.

The lower can upper end vertical part and the first bent part may extend in a direction parallel to each other and be disposed to face each other.

3

The button-type secondary battery may further comprise an insulator configured to prevent the upper can and the lower can from being in contact with each other.

The insulator may be made of a polybutylene terephthalate (PBT) material.

The insulator may comprise: a first insulator portion filled in a space surrounded by a top surface of the beading part, the lower can upper end vertical part, and the upper can electrode terminal part; a second insulator portion extending from the first insulator portion and filled in a space formed between the first bent part and the lower can upper end vertical part; and a third insulator portion extending from the second insulator portion and filled in a space formed between the second bent part and the beading part.

A center hole may be formed in a center of the electrode assembly, and a center pin may be provided in the center hole so as to be fully filled in the center hole.

The button-type secondary battery may further comprise an electrode tab configured to connect an electrode of the electrode assembly to the upper can electrode terminal part, wherein the electrode tab may have one end connected to the electrode of the electrode assembly, and the electrode tab may have the other end connected to a bottom surface of the upper can electrode terminal part in a C-shape.

The upper can may further comprise an upper can protrusion protruding from at least one of the upper can electrode terminal part, the first bent part, or the second bent part toward the insulator.

The lower can may further comprise a lower can protrusion protruding from at least one of the beading part or the lower can upper end vertical part toward the insulator.

A methyl orange PH sheet may be attached to an outer wall of the lower can.

Advantageous Effects

The button-type secondary battery according to the present invention relates to the button-shaped secondary battery, of which a diameter is greater than a length, and may comprise the lower can, into which the electrode assembly is inserted, and the upper can covering the opening of the upper end of the lower can, wherein the beading part that is recessed inward may be provided in the upper end of the lower can, the end of the upper can may have the bent shape so that the upper can and the lower can are coupled to each other while an end point of the end of the upper can is inserted into the beading part. Thus, even though the excessive internal pressure due to the gas generated inside the battery occurs, the gas inside the battery may be collected to prevent the battery from being disassembled or prevent the gas that is harmful to the human body from leaking to the outside of the battery by the gas pressure and prevent the electrolyte from leaking to the outside of the battery.

4

MODE FOR CARRYING OUT THE INVENTION

Figure 1:
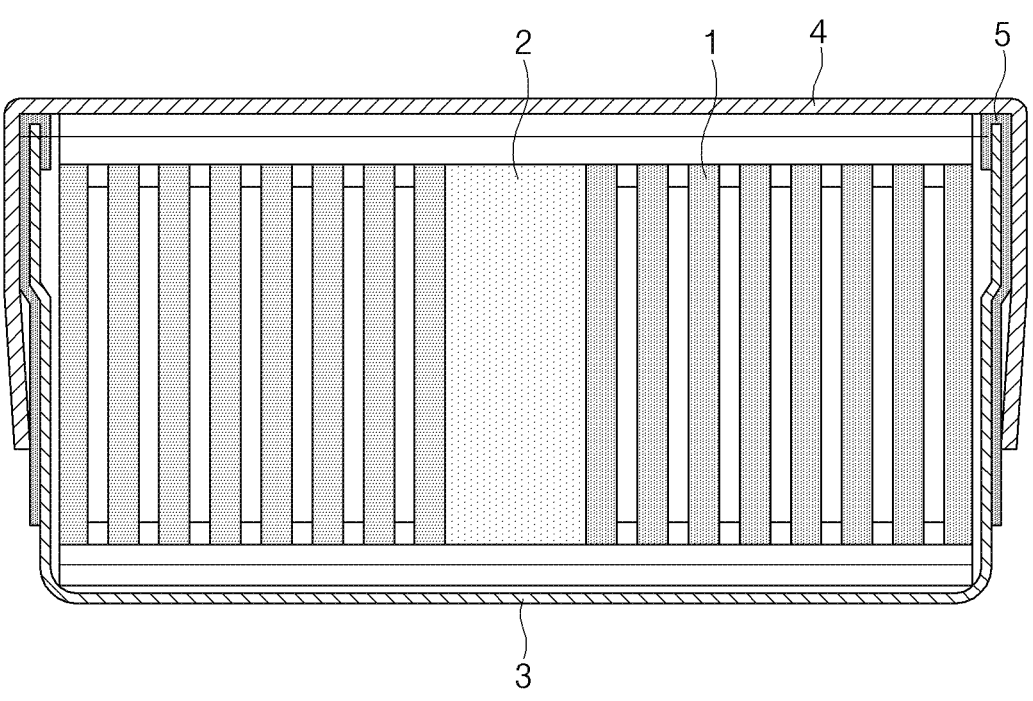
FIG. 1 is a cross-sectional view of a button-type secondary battery according to the related art.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Embodiment 1

Figure 2:
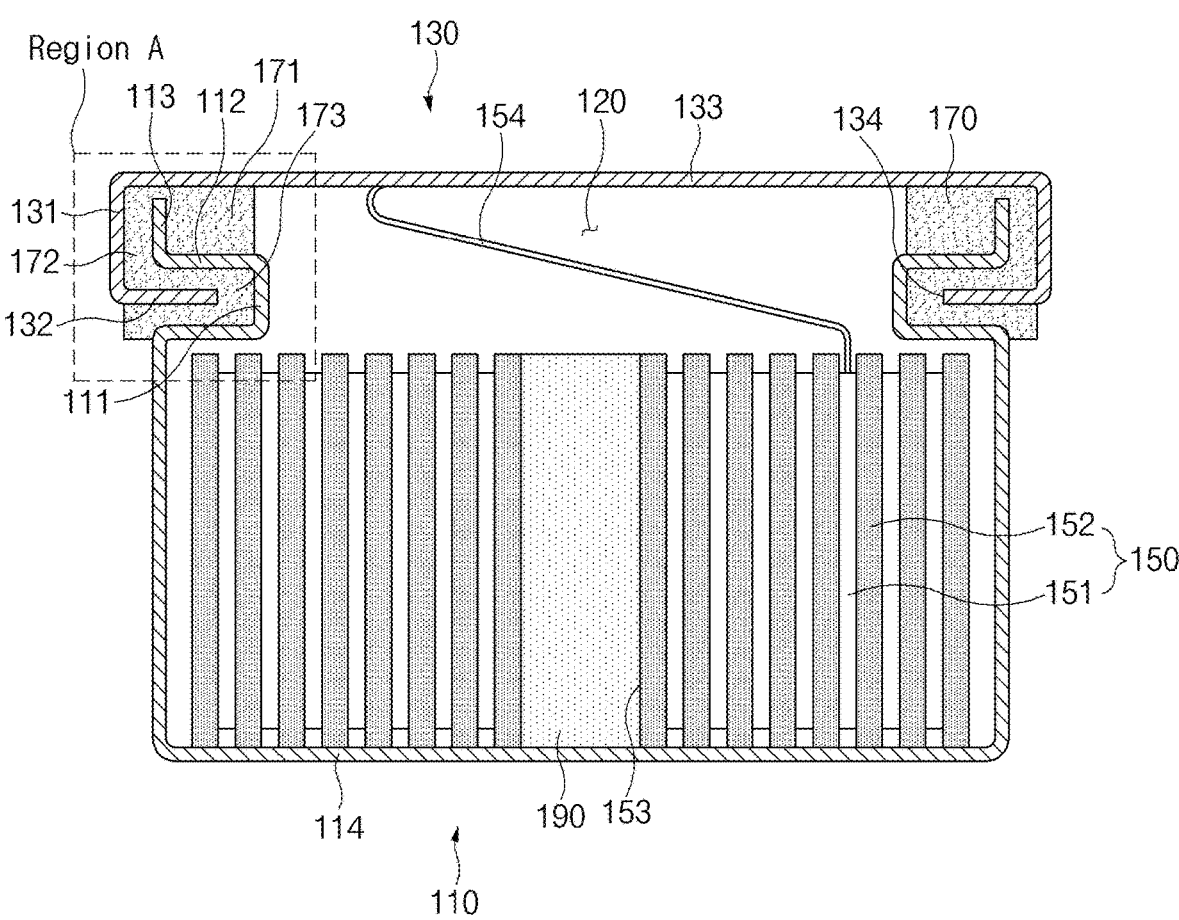
FIG. 2 is a cross-sectional view of a button-type secondary battery according to Embodiment 1 of the present invention.

FIG. 2 is a cross-sectional view of a button-type secondary battery according to Embodiment 1 of the present invention.

Referring to FIG. 2, a button-type secondary battery 100 according to Embodiment 1 of the present invention may be a battery having a cylindrical shape, and a diameter of the cylindrical battery may be larger than a height of the battery. Also, the button-type secondary battery 100 according to Embodiment 1 of the present invention may comprise an electrode assembly 150, a lower can 110, and an upper can 130. The electrode assembly 150 may have a shape in which electrodes 151 and separators 152 are alternately stacked to be wound.

Also, the electrode assembly 150 may be inserted into the lower can 110. The lower can 110 may have an opened upper end in a cylindrical shape. The electrode assembly 150 may be in the form of a jelly roll. When the electrode assembly 150 is disposed in the lower can 110, a winding axis of the electrode assembly 150 may be disposed in a shape that is perpendicular to the ground. The upper can 130 may have a plate shape or a stepped plate shape. In addition, the upper can 130 may have a shape that covers the opening of the upper end of the lower can 110.

An inwardly recessed beading part 111 may be provided in an upper portion of the lower can 110. The beading part 111 may be formed on an entire circumference along an outer circumferential surface of the lower can 110. As illustrated in FIG. 2, the beading part 111 may have a cross-sectional shape that is recessed in a shape that is angled at an angle of 90 degrees or may have a shape that is recessed in the form of a curved surface, unlike the drawing.

In the button-type secondary battery 100 according to Embodiment 1 of the present invention, an end of the upper can 130 is bent, and the upper can 130 and the lower can 110 are coupled to each other while an end point 134 of the end of the upper can is inserted into the beading part 111.

An insulator 170 for preventing the upper can 130 and the lower can 110 from being in contact with each other may be further provided. Particularly, a portion between the end of the upper can 130 having the bent shape and an upper end of the lower can 110 may be a portion at which the upper can 130 and the lower can 110 are directly coupled to each other. Thus, the insulator 170 may be provided to be interposed into the portion.

The end of the upper can 130 may be bent or be curved in a bent shape. In the bent shape, an end of the upper end may be in the form of being inserted with a pressure into the beading unit 111. The end of the upper end may hold the upper end of the lower can 110 comprising the beading portion 111 and the insulator 170 together in a press-fit manner. Since the upper can 130 and the lower can 110 are coupled to each other by applying a pressure, the upper can 130 and the lower can 110 may not be easily separated from each other, but be firmly coupled to each other.

Thus, even if an excessive internal pressure is generated by the gas generated inside the battery, the battery may not be disassembled the pressure, and the gas that is harmful to the human body inside the battery may not leak to the outside of the battery.

Here, the insulator 170 may be made of a polybutylene terephthalate (PBT) material. The PBT material may have good mechanical properties, and in particular, high rigidity to realize a battery having excellent airtightness and durability.

In the button-type secondary battery 100 according to Embodiment 1 of the present invention, the upper can 130 may comprise an upper can electrode terminal part 133, a first bent part 131, and a second bent part 132. The upper can electrode terminal part 133 means a portion connected to the electrode 151 of the electrode assembly 150 to form a terminal and may be a portion covering the opening of the upper end of the lower can 110. The upper can electrode terminal part 133 may be a terminal connecting an external device to the secondary battery according to the present invention. In addition, the upper can electrode terminal part 133 may be a positive electrode terminal.

In addition, the first bent part 131 of the upper can 130 may be a portion that is bent from the end of the upper can electrode terminal part 133 toward a bottom surface 114 of the lower can to extend. The second bent part 132 may be a portion that is bent to extend from an end of the first bent part 131 in a direction of a central axis of the lower can 110. Also, the second bent part 132 may be disposed inside the beading part 111. Since the second bent part 132 is coupled to the inside of the beading part 111 in a state of being pressed in the beading part 111, the separation of the upper can 130 and the lower can 110 may not easily occur.

In the button-type secondary battery 100 according to Embodiment 1 of the present invention, the lower can 110 may comprises a lower can upper end vertical part 113 bent to extend from the end of the beading part 111 toward the upper can electrode terminal part 133. The lower can upper end vertical part 113 may be bent in a vertical direction from the upper end of the beading portion 111 to extend upward. However, it does not necessarily have be bent in a vertical direction, and the upward extension toward the upper can electrode terminal part 133 should be regarded as belonging to the scope of the present invention. Here, the lower can upper end vertical part 113 and the first bent part 131 of the upper can 130 may extend in a direction parallel to each other, but may be disposed to face each other.

In the button-type secondary battery 100 according to Embodiment 1 of the present invention, a collection space 120 in which the internal gas is collected is provided between the upper can 130 and the electrode assembly 150. More specifically, the collection space 120 that is a space for collecting a gas may be provided between the terminal part of the electrode 151 of the upper can 130 and the electrode assembly 150. When the internal gas is generated due to a side reaction of the battery, since the gas is a light gas, the gas may ascend to be filled in the collection space 120.

The collection space 120 between the upper can 130 and the electrode assembly 150 is an available space for the gas collection to serve to prevent a gas from leaking out of the battery (since a hole is not formed in the upper can 130, the gas is not discharged to the outside by passing through the upper can 130). Due to the features of the battery used in wearable electronic devices, if the gas leaks out of the battery, it may harm the human body, and thus, the gas has to be managed so as not to leak to the outside of the battery. For this, the button-type secondary battery 100 according to the present invention may be achieved in the management goal.

In the button-type secondary battery 100 according to Embodiment 1 of the present invention, the insulator 170 may comprise a first insulator portion 171, a second insulator portion 172, and a third insulator portion 173.

Figure 3:
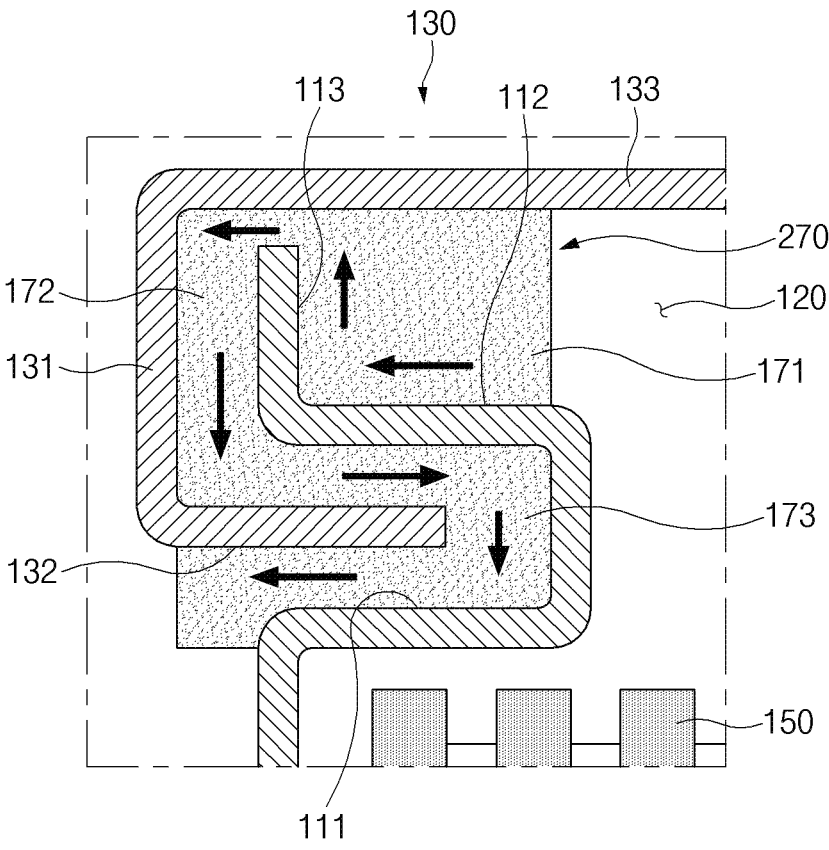
FIG. 3 is an enlarged cross-sectional view of a region A of FIG. 2.

Referring to FIGS. 2 and 3, the first insulator portion 171 may be a portion that is filled in a space surrounded by a top surface 112 of the beading part, the lower can upper end vertical part 113, and the upper can electrode terminal part 133. The second insulator portion 172 may be a portion that extends from the first insulator portion 171 and is filled in a space formed between the first bent part 131 and the lower can upper end vertical part 113. The third insulator portion 173 may be a portion that extends from the second insulator portion 172 and is filled in a space formed between the second bent part 132 and the beading part 111.

In addition, a combined shape of cross-sections of the first insulator portion 171, the second insulator portion 172, and the third insulator portion 173 may be a rectangular shape as a whole. That is, as illustrated in FIG. 3, the insulator 170 has the rectangular shape as a whole, and the bent parts of the upper can 130, the lower can upper end vertical part 113, and the beading part 111 are embedded in a maze-like shape within the rectangular shape.

In this form, the insulator 170 comprising the first, second, and third insulator portions 173 is interposed, and the first bent part 131 and the second bent part 132 of the upper can 130, which are press-fitted to be bent, the beading part 111 of the lower can 110 having the shape that is bent and recessed inward, and the lower can upper end vertical part 113 connected thereto may form a complicated coupling part having the maze-like shape.

Thus, when it is assumed that the gas or electrolyte are discharged out of the battery from the inside of the battery, it is possible to arrive at an external region only after passing through a very complicated shape of the upper can 130 and the lower can coupling part, like a maze. As illustrated in an arrow of FIG. 3, a leak path (or leakage path) of the gas or electrolyte inside the battery may be quite long and complicated, and also, friction force may be large.

As described above, the button-type secondary battery 100 according to Embodiment 1 of the present invention may collect the gas from the inside of the battery even through the excessive internal pressure is generated by the gas generated inside the battery to prevent the battery from being disassembled or prevent the gas that is harmful to the human body from leaking to the outside of the battery by the gas pressure and prevent the electrolyte from leaking to the outside of the battery.

In the button-type secondary battery 100 according to Embodiment 1 of the present invention, a center hole 153 may be formed in a center of the electrode assembly 150, and a center pin 190 may be fully provided in the center hole 153.

When the center pin 190 is formed to completely fill the center hole 153, the electrode assembly 150 may be prevented from being deformed. A core part of the electrode assembly 150, which has particularly weak supporting force, may be deformed by internal heat and internal gas generated when the battery reaction proceeds. When the core part is deformed as described above, the separator 152 that separates a positive electrode from a negative electrode may be deformed, and thus, a short-circuit accident such as contact of the positive electrode and the negative electrode may occur. However, in the present invention, since the center pin 190 is provided to fully fill the center hole 153, the occurrence of such the short-circuit accident may be prevented in advance.

The button-type secondary battery 100 according to Embodiment 1 of the present invention may further comprise a tab 154 of the electrode 151, which connects the electrode 151 of the electrode assembly 150 to the upper can. The tab 154 of the electrode 151 may have one end connected to the electrode 151 of the electrode assembly 150 and the other end connected to a bottom surface of the upper can electrode terminal part 133 in a C-shape. As illustrated in FIG. 2, when the tab 154 of the electrode 151 is connected to the bottom surface of the upper can electrode terminal part 133 in the C-shape, the tab 154 of the electrode 151 may have predetermined elasticity against an impact such as drop, and thus, even if the impact such as the drop occurs, the tab 154 of the electrode tab 151 may be effectively prevented from being broken.

Embodiment 2

Figure 4:
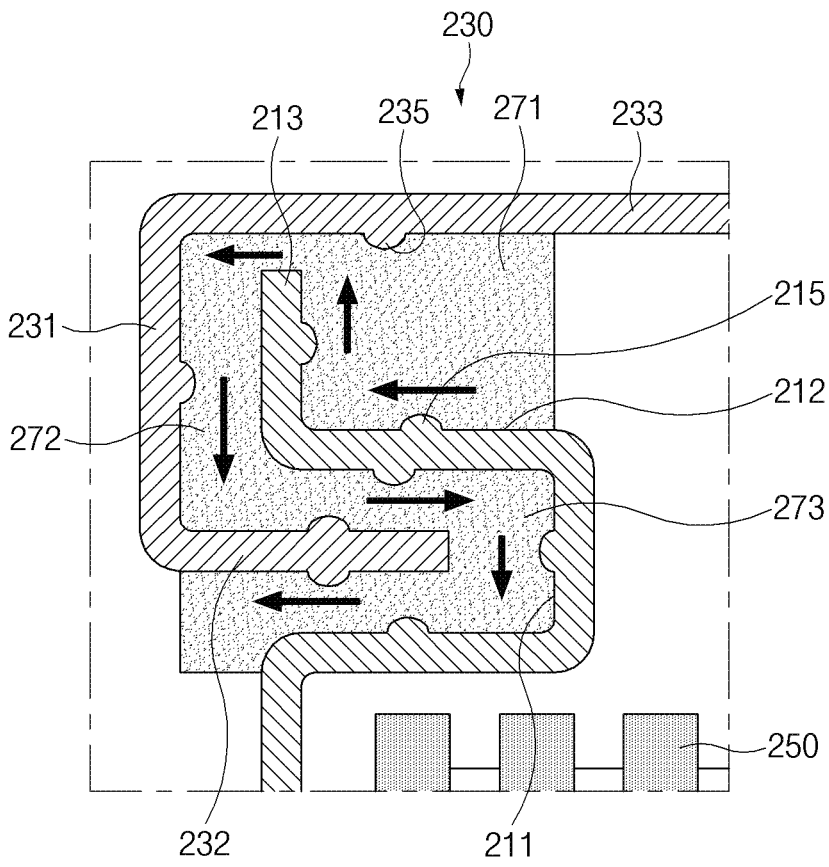
FIG. 4 is a cross-sectional view of the region A of FIG. 2 in a button-type secondary battery according to Embodiment 2 of the present invention.

FIG. 4 is a cross-sectional view of the region A of FIG. 2 in a button-type secondary battery according to Embodiment 2 of the present invention.

Embodiment 2 of the present invention is different from Embodiment 1 in that an upper can 230 further comprises an upper can protrusion 235, and a lower can further comprises a lower can protrusion 215.

The contents that are duplicated with Embodiment 1 will be omitted as much as possible, and Embodiment 2 will be described with a focus on the differences. That is, it is obvious that the contents that are not described in Embodiment 2 may be regarded as the contents of Embodiment 1 if necessary.

Referring to FIG. 4, in the button type secondary battery according to Embodiment 2 of the present invention, the upper can 230 further comprises the upper can protrusion 235 protruding from at least one of an upper can electrode terminal part 233, a first bent part 231, or a second bent part 232 toward an insulator 270.

That is, the upper can protrusion 235 may protrude from all of the upper can electrode terminal part 233, the first bent part 231, and the second bent part 232 or may protrude from any one or two of the upper can electrode terminal part 233, the first bent part 231, and the second bent part 232.

In addition, when the upper can protrusion 235 protrudes from the upper can electrode terminal part 233 toward the insulator 270, in particular, when the upper can protrusion 235 protrudes toward a first insulator portion 271, a recess may be formed so that the upper can protrusion 235 is inserted also in the first insulator portion 271. Of course, it is also possible to be designed so that the recess is not formed in the first insulator portion. This method may be applied to all of the first insulator portion 271, a second insulator portion 272, and a third insulator portion 273.

In addition, the lower can may further comprise a lower can protrusion 215 protruding from at least one of a beading part 211 or a lower can upper end vertical part 213 toward the insulator 270.

That is, the lower can protrusion 215 may protrude from both the beading part 211 and the lower can upper end vertical part 213 or may protrude from any one of the beading part 211 and the lower can upper end vertical part 213.

In addition, when the lower can protrusion 215 protrudes from the lower can upper end vertical part 213 toward the insulator 270, in particular, when the lower can protrusion 215 protrudes toward the first insulator portion 271, a recess may be formed so that the lower can protrusion 231 is inserted also in the first insulator portion 271. Of course, it is also possible to be designed so that the recess is not formed in the first insulator portion 217. This method may be applied to all of the first insulator portion 271, a second insulator portion 272, and a third insulator portion 273.

Although both the upper can protrusion 235 and the lower can protrusion 215 are formed together, the upper can protrusion 235 and the lower can protrusion 215 may not be necessarily formed together, and only one of the two protrusions may be formed.

When the upper can protrusion 235 or the lower can protrusion 215 is formed, a leak path may be significantly more complicated and more complex to more significantly prevent an internal gas from leaking out of the battery or an electrolyte from leaking out of the battery.

A PH sheet made of a methyl orange material may be attached to an outer wall of the lower can 110.

In general, the electrolyte is prepared by dissolving or dissociating salts containing alkali metal cations such as $Li+$, $Na+$, $K+$, and the like and anions such as $PF6-$, $BF4-$, $Cl-$, $Br-$, $I-$, $ClO4-$, $AsF6-$, $CH3CO2-$, $CF3SO3-$, $N(CF3SO2)2-$, $C(CF2SO2)3-$, and the like in an organic solvent consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma butyrolactone (Y-butyrolactone) or mixtures thereof and thus shows weak acidity of pH3.0 to pH4.5. Therefore, methyl orange, methyl red, etc. may be used as indicator components that show reactivity with respect to the electrolyte in the acidity range. As in the present invention, when the methyl orange PH sheet is attached to the outer wall of the lower can 110, the leakage of the electrolyte may be clearly detected through a color change when the electrolyte leaks.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

100: Button-type secondary battery
110: Lower can
111, 211: Beading part
112, 212: Top surface of beading part
113, 213: Lower can upper end vertical part
114: Bottom surface of lower can

120: Collection space
130, 230: Upper can
131, 231: First bent part
132, 232: Second bent part
133, 233: Upper can electrode terminal part
134: End point of end of upper can
150, 250: Electrode assembly
151: Electrode
152: Separator
153: Center hole
154: Electrode tab
170, 270: Insulator
171, 271: First insulator portion
172, 272: Second insulator portion
173, 273: Third insulator portion
190: Center pin
215: Lower can protrusion
235: Upper can protrusion
The invention claimed is:

1. A button-type secondary battery, comprising:
an electrode assembly;
a lower can into which the electrode assembly is disposed; and
an upper can configured to cover an opening of an upper end of the lower can,
wherein a beading part recessed inward is provided in an upper portion of the lower can,
wherein an end of the upper can has a bent shape so the upper can and the lower can are coupled to each other while an end point of the end of the upper can is inserted into the beading part,
wherein a collection space in which an internal gas is collected is between the upper can and the electrode assembly,
wherein the upper can comprises:
   an upper can electrode terminal part connected to an electrode of the electrode assembly is configured to form a terminal, the upper can electrode terminal part being configured to cover the opening of the upper end of the lower can;
   a first bent part bent to extend in a vertical direction from an end of the upper can electrode terminal part toward a bottom surface of the lower can; and
   a second bent part bent to extend from an end of the first bent part in a horizontal direction toward a central axis of the lower can, the second bent part being disposed inside the beading part in a plan view, and
wherein the lower can comprises a lower can upper end vertical part bent to extend upward in the vertical direction from an end of the beading part toward the upper can electrode terminal part.

2. The button-type secondary battery of claim 1, wherein the lower can upper end vertical part and the first bent part extend in the vertical direction parallel to each other and are disposed to face each other.

3. The button-type secondary battery of claim 2, further comprising an insulator configured to prevent the upper can and the lower can from being in contact with each other.

4. The button-type secondary battery of claim 3, wherein the insulator includes a polybutylene terephthalate (PBT) material.

5. The button-type secondary battery of claim 3, wherein the insulator comprises:
   a first insulator portion filled in a space surrounded by a top surface of the beading part, the lower can upper end vertical part, and the upper can electrode terminal part;
   a second insulator portion extending from the first insulator portion and filled in a space formed between the first bent part and the lower can upper end vertical part; and
   a third insulator portion extending from the second insulator portion and filled in a space formed between the second bent part and the beading part.

6. The button-type secondary battery of claim 1, wherein a center hole is formed in a center of the electrode assembly, and
   a center pin is at the center hole so as to be fully filled in the center hole.

7. The button-type secondary battery of claim 1, further comprising an electrode tab configured to connect an electrode of the electrode assembly to the upper can electrode terminal part,
   wherein the electrode tab has one end connected to the electrode of the electrode assembly, and
   the electrode tab has the other end connected to a bottom surface of the upper can electrode terminal part in a C-shape.

8. The button-type secondary battery of claim 5, wherein the upper can further comprises an upper can protrusion protruding from at least one of the upper can electrode terminal part, the first bent part, or the second bent part toward the insulator.

9. The button-type secondary battery of claim 5, wherein the lower can further comprises a lower can protrusion protruding from at least one of the beading part or the lower can upper end vertical part toward the insulator.

10. The button-type secondary battery of claim 1, wherein a methyl orange PH sheet is attached to an outer wall of the lower can.

11. The button-type secondary battery of claim 1, wherein a diameter of the button-type secondary battery is greater than a height of the button-type secondary battery.

12. The button-type secondary battery of claim 1, wherein beading portion is horizontally adjacent to the collection space, and the beading portion is higher than the electrode assembly with respect to the vertical direction.

* * * * *